United States Patent [19]

Fretwell, Jr.

[11] E Re. 29,279

[45] Reissued June 28, 1977

[54] DEVICE FOR LAUNCHING AND DOUSING LIGHT SAILS SUCH AS SPINNAKERS

[76] Inventor: Jack W. Fretwell, Jr., Millwood, Va. 22646

[22] Filed: Nov. 20, 1975

[21] Appl. No.: 633,710

Related U.S. Patent Documents

Reissue of:

[64] Patent No.: 3,861,343
Issued: Jan. 21, 1975
Appl. No.: 430,562
Filed: Jan. 3, 1974

[52] U.S. Cl. ..... 114/104
[51] Int. Cl.² ..... B63H 9/10

[58] Field of Search ..... 114/102–107, 114/39

[56] References Cited

UNITED STATES PATENTS 2,595,110 4/1952 Steube et al. ..... 114/104

*Primary Examiner*—Trygve M. Blix
*Assistant Examiner*—Sherman D. Basinger

[57] ABSTRACT

Device for aiding the launching and dousing of light sails comprising a set of smooth rings encircling the furled sail at intervals along its height enabling it to remain furled while being hoisted, launching the sail by moving the rings upwardly out of encircling engagement with the sail and dousing it by moving the rings downwardly into encircling engagement with the sail.

14 Claims, 5 Drawing Figures

FIG. 1
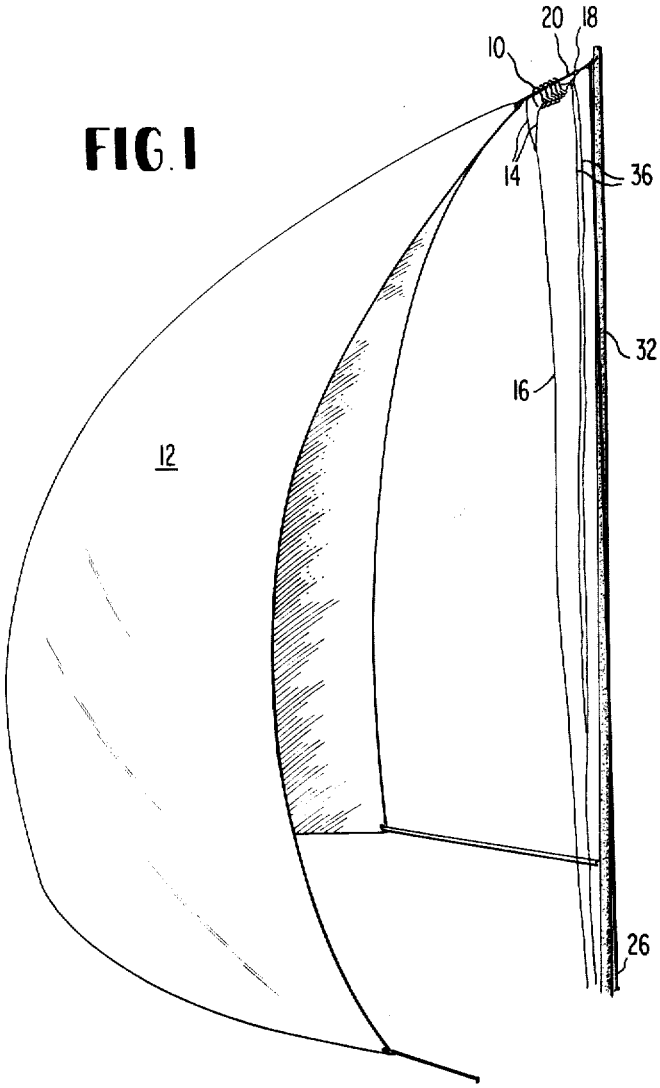
FIG. 2
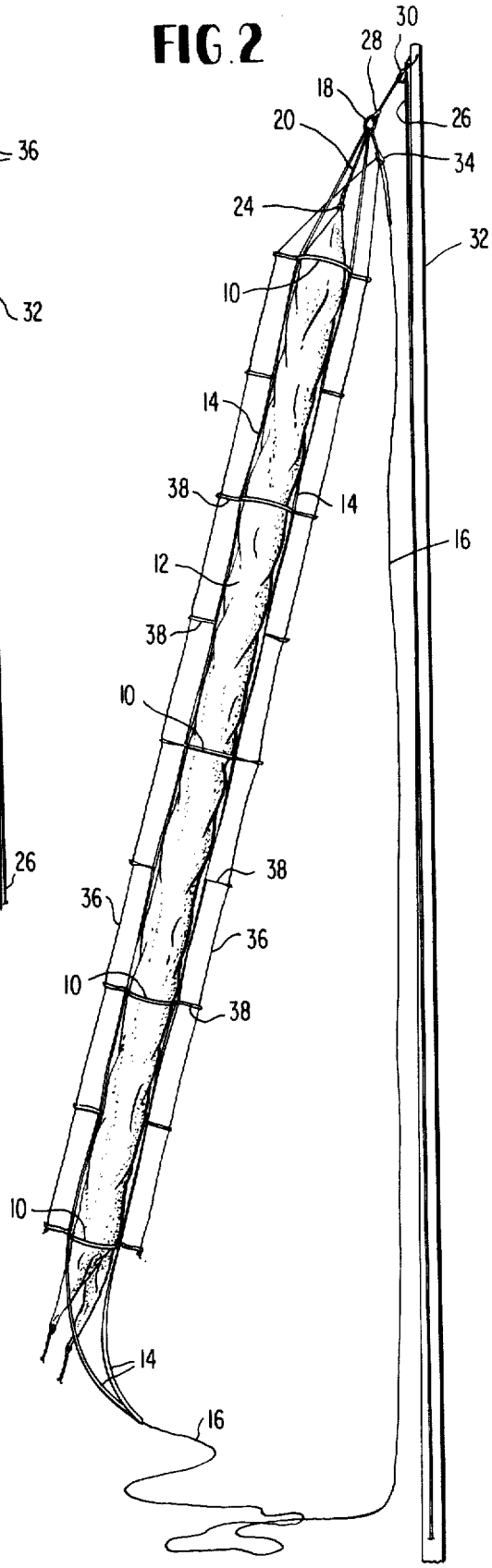
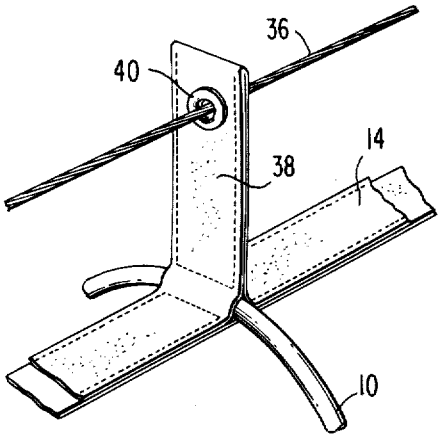
FIG. 3

DEVICE FOR LAUNCHING AND DOUSING LIGHT SAILS SUCH AS SPINNAKERS

Matter enclosed in heavy brackets [ ] appears in the original patent but forms no part of this reissue specification; matter printed in italics indicates the additions made by reissue.

This invention relates to devices for simplifying the launching and dousing of light sails such as spinnakers.

Up until this invention was made, the launching and dousing of light sails such as spinnakers was an arduous if not dangerous operation. Launching has been performed manually in the past by hoisting the sail as it is let out manually from a pile on the deck. Dousing the spinnaker has also been achieved manually in the past by lowering it and gathering it in by hand. In high wind or heavy seas this was at best an extremely difficult job.

One prior improvement provides stops made of frangible material which encircle the sail in furled condition at spaced intervals along the height of the sail, After the sail was hoisted and the lower ends tied down, the lower one or two of the stops were broken to release the lower portion of the sail. As the wind caught the lower portions, the expanding force on the sail broke the remaining stops to free the full sail. While this prior improvement tended to simplify the launching of the sail, it did nothing for alleviating the difficulties and dangers in lowering it and gathering it in. It also added the further chore of properly furling the sail and setting the stops after use to prepare it for its next use.

Another prior improvement is disclosed in U.S. Pat. No. 2,595,110 and involves a sleeve of nylon that is arranged to be pulled down around the spinnaker to place it in a furled condition. When the sail is hoisted the sleeve is slid upwardly by pulling at its lower end and collapsing it as it is slid upwardly and off of the sail. The sail is thus released. When it is desired to douse the sail the lower end of the sleeve is pulled down over it. This improvement never became popular and one can assume that its lack of popularity was due to problems arising from bunching and entanglement of lines, sail and sleeve while the sleeve is being collapsed and extended during use, the inaccessibility to the sail when sheathed and the inability of moisture to escape from the sail when sheathed.

The present invention overcomes the above-mentioned difficulties of the prior art and provides a device for aiding the launching and dousing of the type of sail known as a spinnaker that is facile and foolproof in use. The device comprises a set of smooth rings, which encircle the sail at intervals up and down its height enabling the sail to remain furled while it is raised. The sail is launched from its hoisted, furled by hauling lines which run from the base of the mast, through a double sheave block near the peak of the spinnaker, down to the lowest ring encircling the sail. This ring slides up the furled spinnaker collecting the rings above it as it travels, and releases the spinnaker to the wind. As more and more of the sail is opened, the wind facilitates the further upward movement of the rings. Under sail, the rings hang on the strap, which comprises a short length of line between the spinnaker and the halyard, which replaces the length of halyard normally left between the masthead and the peak of the sail. To douse the spinnaker, a line running from the lowest ring and down the mast is carried forward to the bow of the boat. Hauling upon this line pulls the rings, which are connected to one another, back down around the spinnaker, refurling it. The device of the present invention at once provides for the launching and dousing of spinnakers while raised, or which automatically leases the spinnaker ready to be stowed for future use without further attention such as folding or stopping. The benefits of the device of this invention are found in the practical elimination of the counterforce of wind in the operations of raising and lowering the spinnaker. Without such elimination, these tasks are at best arduous and time-consuming and at worst dangerous to sail and sailor. When furled and lowered, the spinnaker may be stowed with rings in place for future use with no further attention.

Embodiments of the present invention are described in detail in reference to the accompanying drawings in which:

FIG. 1 is a side elevation of the foremast of a sailing vessel showing a spinnaker unfurled and open to the wind and the device of this invention neatly stowed at the masthead;

FIG. 2 is a side elevation similar to FIG. 1 showing the spinnaker in furled condition with the device of this invention operatively retaining the spinnaker in the furled condition;

FIG. 3 is a fragmentary view in perspective showing the manner in which the lowering means is attached to the ring and the manner in which the raising means is guided adjacent to the rings;

Figure 4:
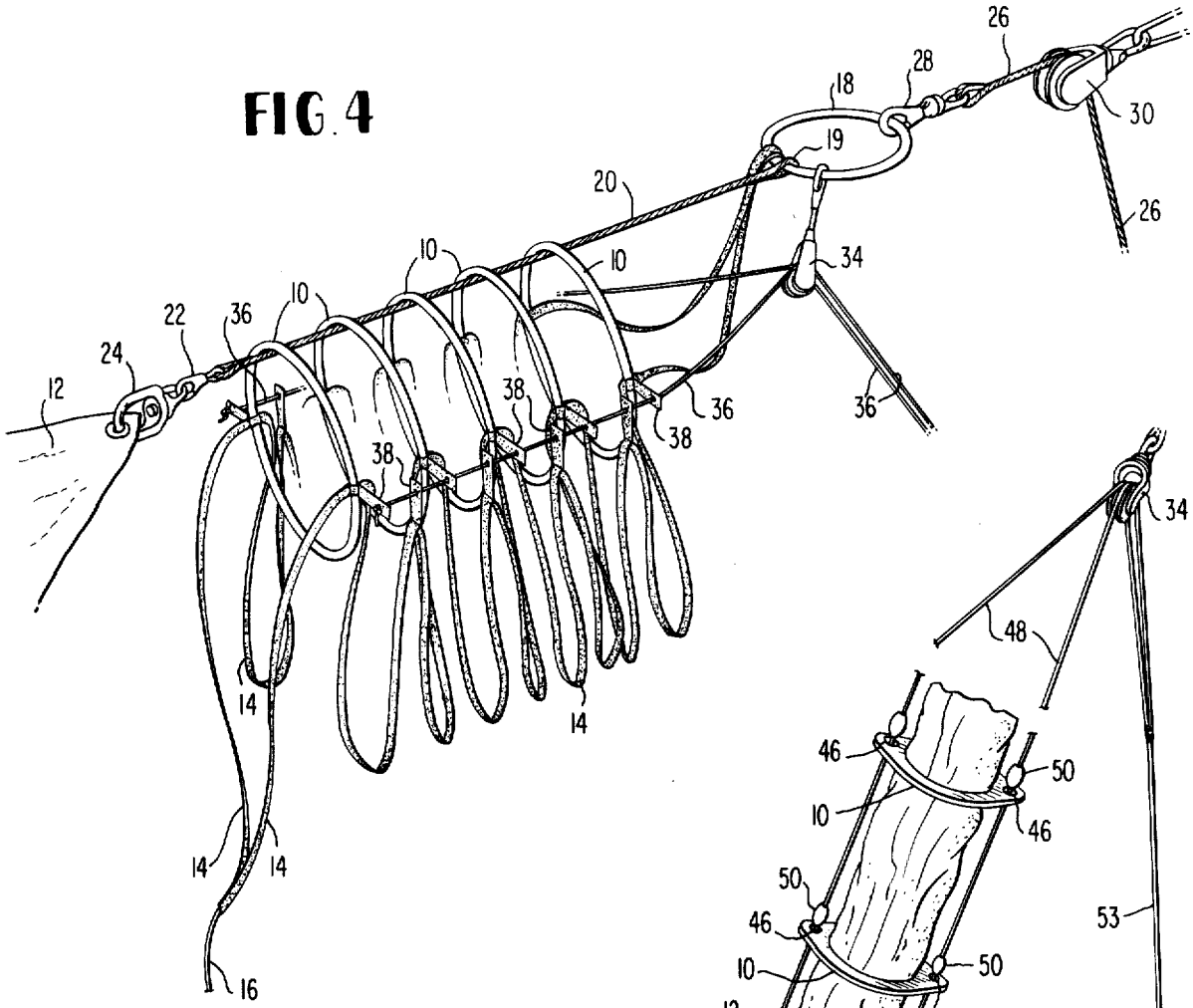
FIG. 4 is a side elevation illustrating the manner in which the device of this invention is associated with the sail and the masthead.

Referring to the drawings, the device of this invention comprises a series of smooth, round, rigid rings 10, which encircle the furled sail 12 at intervals of from five to ten feet along its height. The size and number of rings 10 is dependent on the size and weight of the sail 12. Two strips 14 of sailcloth, nylon or dacron run up either side of the cylinder described by the rings 10, and are secured to each ring 10 thus holding it in place. Immediately below the ring nearest the bottom of the sail the strips are joined and are secured to a single length of line or halyard 16. Above the ring nearest the top of the sail the strips are extended and secured at a single point on a small connecting ring 18 which is fastened, e.g., by an eye splice 19, to a length of line or strap 20. The other end of this short length of line or strap 20 is eye-spliced to a shackle 22 which is fastened to the swivel eye 24 of the spinnaker swivel at the peak of the spinnaker. When in use, the spinnaker halyard 26 is secured to the stainless ring 18 by means of shackle 28 rather than directly to the spinnaker swivel eye 24. The halyard 26 passes through a single sheave block 30 which is secured to the masthead 32. Below the eye splice 19 on the stainless ring 18 is secured a small double sheave block 34 to accommodate a line 36 which passes down along the strips and is fastened at its lower ends to opposite sides of the lowermost ring 10.

At the points where the strips 14 join the rings 10 and also at points on the strips 14 halfway between each ring 10, the strips are folded outward and stitched to form tabs or arms 38, into which eyes or grommets 40 are stamped. Line 36 is knotted at the lower end and beginning with the lowest ring 10 passes up through the grommets or eyes 40 along one of the strips, through half the double sheave block 34, back through the other half of the block, and back down through the grommets or eyes 40 on the other side. Upon passing through the grommet or eye 40 in the lowest ring 10 the line 36 is knotted and trimmed. Where the line 36 passes through and behind the double sheave block, a point which is approximately at the middle of its length, the line is secured to the other end of the halyard 16. The halyard 16 thus extends from attachment to the joined lower ends of strips 14 at a point near and behind the foot of the furled spinnaker 12 to the double sheave block 34 on the stainless ring 18.

When it is desired to launch the spinnaker 12, it is hoisted by the halyard 26 and secured in hoisted position. The lower corners of the spinnaker are secured in the usual manner. The rings 10 are slid upwardly along the furled spinnaker 12 by pulling downwardly on the halyard 16 so as to pull the line 36 through the double sheave block 34. This raises the lowermost ring 10 which collects the rings above it as it ascends. When the rings 10 reach the top of the spinnaker 12 they are deposited on the strap 20 where they are retained until it is desired to douse the spinnaker. As the rings 10 ascend, the spinnaker 12 is exposed to the wind which causes it to billow and this also assists in raising the rings. The strips 14 easily collapse or fold as the rings 10 ascend and store compactly between the rings when they reach and are deposited on the strap 20.

When it is desired to douse the sail 12, the rings 10 are slid off of the strap 20 and downwardly around the sail 12 by pulling downwardly on halyard 16 so as to pull the joined lower end of the strips 14 downwardly. The lowermost ring 10 encircles and collapses the spinnaker 12 to spill the wind. Succeeding rings 10 retain the spinnaker 12 in furled condition as they are lowered into position. The spinnaker 12 can be lowered or left hoisted until it is desired to use it again. The condition of the spinnaker 12 when it is furled can be easily observed and any undesirable folding or entanglements thereof are easily corrected at any point along its height.

Figure 5:
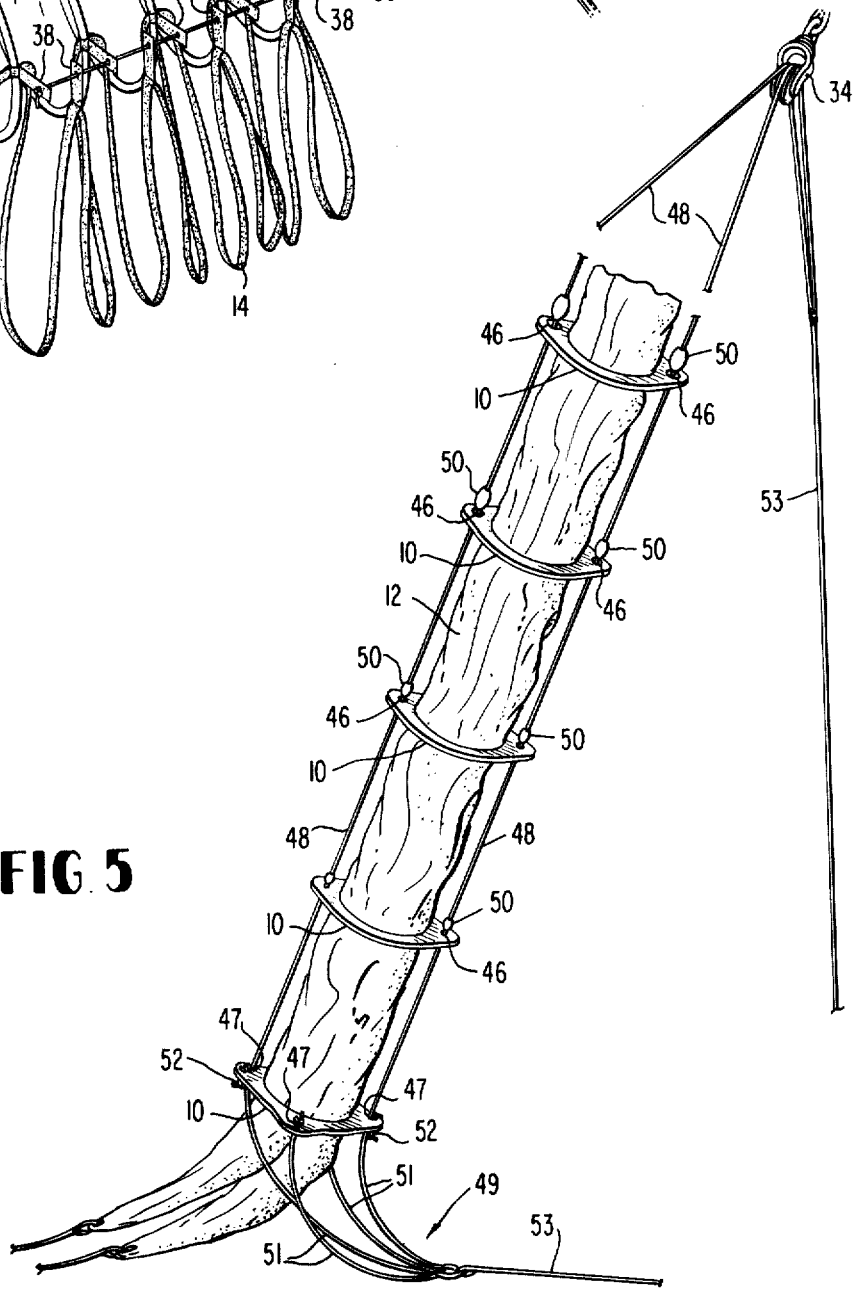
FIG. 5 is a perspective view of another embodiment of this invention illustrating the use of a single line for raising and lowering the device.

FIG. 5 illustrates an even more simplified embodiment of the device of this invention which utilizes two lines for raising and lowering the rings 10. In this version, each ring 10 is formed with a hole 46 in its annular portion on each side. The holes 46 in the lowermost ring 10 are the smallest and the holes 46 in the rings 10 above it are progressively larger. A halyard 48 passes through the holes 46 in the rings and is formed with stops 50 fixed thereto at spaced apart points along its length. The ends of the halyards 48 are secured to the hole 46 of the lowermost ring 10 by means of knots 52. The double sheave block 34 is of a size adequate to accommodate the largest stops 50 or two single sheave blocks of a size adequate to accommodate the largest stops 50 and the halyards 48 pass through one block 34 and return through the other. The stops 50 are formed in different sizes, the lowermost being the smallest. Each stop is so sized that it will not pass through the hole 46 of the ring 10 below it but will freely pass through the holes 46 of all rings above it. The lowermost ring 10 is formed with four holes 47 in its annular portion and the two halyards 48 pass through diametrically opposed holes. A halter 49 of four lines 51, each of which passes through the four holes and is knotted to secure them to the lowermost ring 10, is provided. A halyard 53 is secured to the halter 49 and passes down to the deck and back up the mast to the upper (middle) part of the halyard 48 where it is secured.

When it is desired to launch the spinnaker 12, it is hoisted by the halyard 26 and secured in its hoisted position. The rings 10 are slid upwardly on the spinnaker 12 by hauling downwardly on the halyard 16 so as to pull it through the single sheave block and raise the lowermost ring 10. As the lowermost ring 10 ascends it collects the rings above it and the stops 50 freely pass through the holes 46 of the rings 10 respectively positioned above them. As the rings reach the peak of the spinnaker 12 they are deposited on the strap 20 and stored there until the spinnaker 12 is to be doused.

When it is desired to douse the spinnaker 12, the halyard 48 is pulled downwardly to move the lowermost ring 10 off of the strap 20 into encircling engagement with the top of the spinnaker. As it moves downwardly on the spinnaker 12, the lowermost ring 10 collapses the spinnaker to spill the wind and furl the spinnaker. Each stop 50 passes through the holes 46 in succeeding rings 10 until it reaches one that it will not pass through whereupon the stop engages the ring 10 having the hole through which it will not pass and moves it off of strap 20 into encircling engagement with the spinnaker 12 to retain it in furled condition. This continues until all rings have been slid off of strap 20 into encircling engagement with the furled spinnaker 12. This embodiment has the advantages of being simpler in construction and utilizing fewer lines or strips thus minimizing all opportunity for fouling or entanglement.

The devices described above can be modified in any number of obvious ways. The rings can be constructed of any suitable material that will provide a smooth, low friction surface. As examples, the rings 10 can be made of stainless steel, nylon, Teflon or any other suitable plastic. The strips 14 can be in the form of ribbons of nylon cloth, dacron cloth, sailcloth, canvas or other suitable flexible material or they can be in the form of ropes or lines.

Sizes are not critically important. It has been found that one-quarter inch, two ply dacron strips are satisfactory for the strips 14 and one-eighth inch dacron line is satisfactory for the lines and halyards 16 and 36. The connecting ring 18 can be 1⅜inch in diameter and made of three-sixteenths inch stock. The rings 10 are satisfactorily 5 inches in inside diameter and made of three-eighths inch stock. In the usual cases, 3 to 10 rings 10 are adequate in the device of this invention. In the embodiment of FIG. 5, the lowermost stop 50 is satisfactorily sized five thirty-seconds inch and the hole 46 in the ring 10 just below it is satisfactorily sized nine sixty-fourths inch. The next higher stop 50 and hole 46 can be sized six thirty-seconds inch and eleven sixty-fourths inch respectively; the next higher stop 50 and hole 46 can be seven thirty-seconds inch and thirteen sixty-fourths inch respectively; and the highest stop 50 and hole 46 can be eight thirty-seconds inch and fifteen sixty-fourths inch respectively. The inside diameter of the rings 10 employed in the embodiment of FIG. 5 is small enough to tightly engage the sail encircled by it with the provision of sufficient friction to prevent further downward sliding after its stop 50 has moved it to its appropriate position. Nevertheless, the inside diameter should not be so small as to provide such amount of friction that prevents sliding movement when the line 48 is hauled, as in moving the rings 10 upward or downward. In some cases it may be desirable to add additional arms 38 and eyes 40 may be positioned along strip 14 to provide more positive guidance of the halyards 36. When the strips 14 are in the form of a line the arms 38 may also be in the form of pieces of line which are knotted such as by a clove hitch or other suitable knot to the rings 10 or the line or strip 14. It is preferred to make the rings 10 as thin as possible consistent with providing adequate strength. This makes it possible to dispense with the strap 20 which is of considerable advantage in permitting the sail to be drawn up close to the masthead. This is an advantage not provided by the prior devices such as described in the aforementioned patent. While the device of this invention has been explained with reference to a spinnaker it can be applied equally well to any other light sail such as jibs and staysails.

What is claimed is:

1. A device for launching and dousing a light sail connected to the mast of a sailing vessel comprising a plurality of at least two rings spaced from each other along the length of said sail and encircling said sail in furled condition, each said ring being of a size which, when positioned on the sail in the furled condition, provides upwardly slideable engagement with the sail, the lowermost ring engaging the lower portions of the sail, the uppermost ring engaging the upper portions of the sail and any intermediate ring or rings engaging intermediate portions of the sail when in the furled condition to retain said sail in the furled condition; means for raising the lowermost ring into engagement with the next ring above it to raise said next ring and successively to raise all rings to slide said rings upwardly along said sail to disengage all rings from the sail and thereby launch the sail; and means for lowering the the rings beginning with the lowermost ring in succession into sliding encircling engagement with said sail forcing same into furled condition and positioning said rings in the aforementioned spaced apart positions to retain said sail in furled condition.

2. Device as claimed in claim 1 wherein said means for raising said rings to launch the sail is a line attached to the lowermost ring and extending to said mast, each ring above said lowermost ring is provided with guide means for guiding said line adjacent to each said ring when said line is moved upwards and downwards, whereby movement of said line towards said mast raises said rings to disengage them from the sail to launch it.

3. Device as claimed in claim 1 wherein said means for lowering said rings to furl the sail is a flexible elongate strip member connected at its upper end to the mast and extending the substantial length of said sail in furled condition, each ring being fixed to the strip member at the spaced apart positions of said rings when the sail is in furled position and said strip member is extended, said strip member being collapsed when said raising means moves the lowermost ring and the lower end of said strip member upwardly to launch the sail and being extended when said lower end thereof is moved downwardly to slide the rings into encircling engagement with the sail to furl it.

4. Device as claimed in claim 3 wherein said lowering means comprises two said elongate strip members fixed to opposite sides of said rings.

5. Device as claimed in claim 4 wherein said strip members comprise ribbons of two ply dacron.

6. Device as claimed in claim 3 wherein said strip member comprises a line.

7. Device as claimed in claim 4 wherein each said strip member is provided with outwardly extending flexible arms formed with an aperture, each said arm being positioned adjacent to a ring and said raising means is a line attached to the lowermost ring and passing upwardly through an eye of each arm to the mast, whereby movement of said line towards said mast raises said rings to disengage them from the sail to launch it.

8. Device as claimed in claim 1 wherein each said ring above the lowermost ring is formed with an eye in its annular portion, said eye of the uppermost ring being larger than the others and the eyes of each lower ring being smaller than the one above it and said raising and lowering means comprise a line formed with different sized stops fixed thereto along its length, each stop being positioned just above the eye of a ring when said rings are in spaced apart position and said line is extended along the sail in full furled condition and being of a size that it will not pass through the eye of the ring next below it but it will pass through the eye of each ring above it.

9. Device as claimed in claim 8 wherein said line passes around a pulley connected to the mast.

10. Device as claimed in claim 1 wherein a strap is attached at one end to the head of the sail and at the other end to the mast, said strap collecting and holding said rings when they are raised and the sail is in full unfurled condition.

*11. A device for launching a light sail connected to the mast of a sailing vessel comprising at least two rings spaced from each other along the length of said sail and encircling said sail in furled condition, each said ring being of a size which, when positioned on the sail in the furled condition, provides upwardly slideable engagement with the sail, the lowermost ring engaging the lower portions of the sail, the uppermost ring engaging the upper portions of the sail and any intermediate ring or rings engaging intermediate portions of the sail when in the furled condition to retain said sail in the furled condition and means for raising the lowermost ring into engagement with the next ring above it to raise said next ring and successively to raise all rings to slide said rings upwardly along said sail to disengage all rings from the sail and thereby launch the sail.*

*12. Device as claimed in claim 11 wherein said rings are provided with means for positioning said rings at spaced apart positions along said sail in furled condition.*

*13. A device for dousing a light sail connected to the mast of a sailing vessel comprising at least two rings interconnected by a flexible material permitting said rings to move from close side-by-side positions at the top of the sail in unfurled condition to positions spaced apart from each other along the length of the sail encircling the sail when in furled condition, each said ring being of a size which, when positioned on said sail in furled condition, slideable engages said sail in furled condition to retain said sail in the furled condition, and means for lowering the rings beginning with the lowermost ring in succession into sliding encircling engagement with said sail forcing same into furled condition and positioning said rings in the aforementioned spaced apart positions to retain said sail in furled condition.*

*14. Device as claimed in claim 13 wherein said means for lowering said rings to furl the sail is a flexible elongate strip member connected at its upper end to the mast and extending along the length of said sail in furled condition, each ring being fixed to the strip member at the spaced apart positions of said rings when the sail is in furled condition and said strip member is extended.*

* * * * *